No. 895,542. PATENTED AUG. 11, 1908.
J. F. DURYEA & W. M. REMINGTON.
TRANSMISSION GEAR.
APPLICATION FILED JULY 15, 1907.

Witnesses:
H. L. Sprague
H. W. Bowen

Inventors:
James F. Duryea
Wm. M. Remington
by Chapin & Co.
Attorney

UNITED STATES PATENT OFFICE.

JAMES FRANK DURYEA AND WILLIAM M. REMINGTON, OF SPRINGFIELD, MASSACHUSETTS, ASSIGNORS TO STEVENS-DURYEA COMPANY, OF CHICOPEE FALLS, MASSACHUSETTS, A CORPORATION.

TRANSMISSION-GEAR.

No. 895,542.　　Specification of Letters Patent.　　Patented Aug. 11, 1908.

Application filed July 15, 1907.　Serial No. 383,772.

*To all whom it may concern:*

Be it known that we, JAMES FRANK DURYEA and WILLIAM MERRIAM REMINGTON, citizens of the United States of America, residing at Springfield, in the county of Hampden and State of Massachusetts, have invented new and useful Improvements in Transmission-Gears, of which the following is a specification.

This invention relates to variable speed transmission devices broadly, and specifically relates to the construction of the gear-shifting lever and the casing in which it is inclosed when used in that type of transmission mechanism styled "sliding gear".

The object of the present invention is to provide a construction which will readily permit the removal of the gear-shifting lever without, as a preliminary operation, dismounting any other part of the transmission mechanism, and the invention consists in a novel construction of casing and a novel construction of gear-shifting lever, and general arrangement of the parts whereby the above specified object of the invention may be put into practice, the accompanying drawings showing the invention as embodied in its preferred form.

Figure 1:
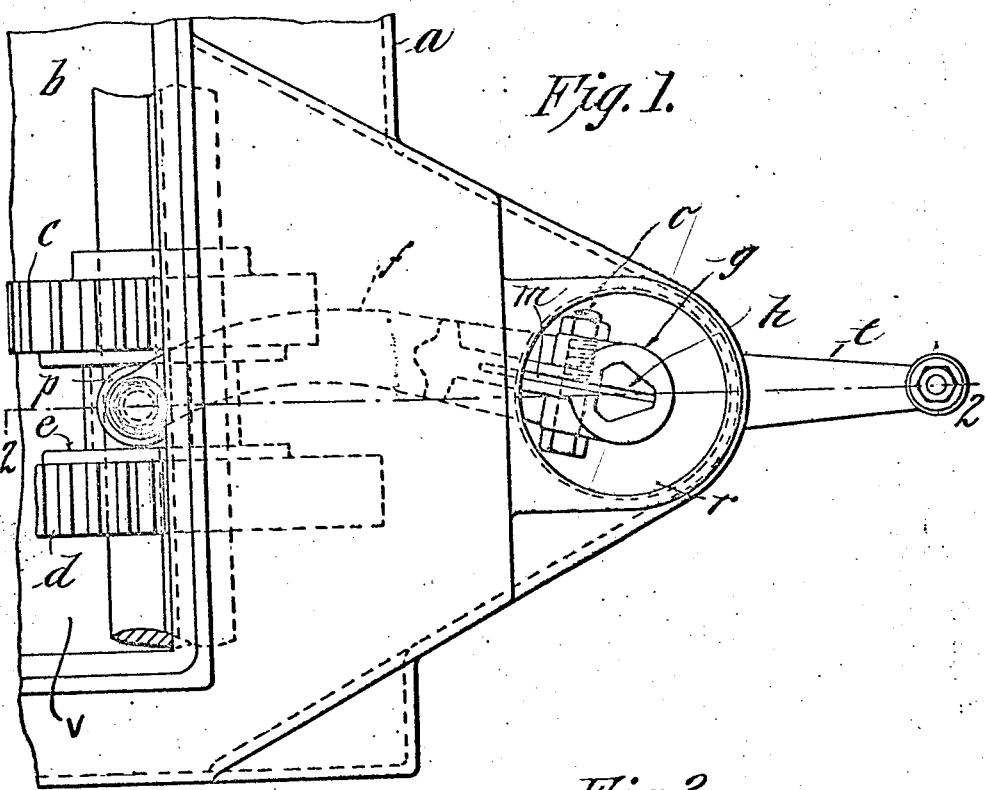
Figure 2:
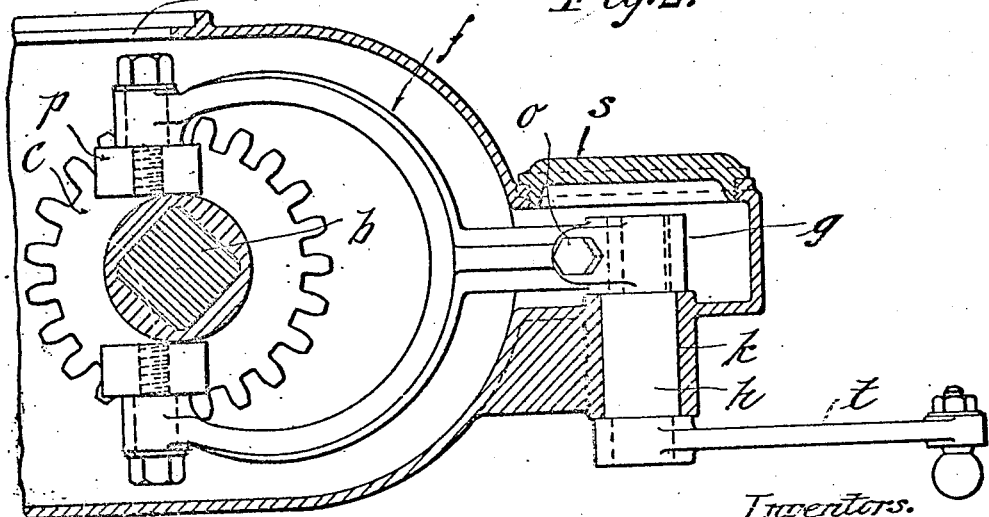

In the drawings forming part of this application,—Figure 1 is a plan view of a part of the transmission casing showing a portion of one of the shafts therein and two sliding gears with which the gear-shifting lever engages, a cap for an opening in said casing being removed and the hand hole cover being also removed. Fig. 2 is a sectional elevation on the line 2—2, Fig. 1.

Referring to these drawings, $a$ indicates the casing of a transmission mechanism of the type specified: $b$ a portion of that shaft in the casing which carries the sliding gears, and $c$ and $d$ two of such gears connected together by a collar $e$ (or the gears and collar may be integral) grooved to receive the two ends of a forked lever $f$ which is the gear-shifting lever, and whereby these gears $c$ and $d$ may be moved towards either end of the shaft $b$ to throw them into mesh with other gears keyed to another shaft, not shown, the construction of transmission mechanisms of this type being too well known to require detailed description or illustration herein.

The lever $f$ is provided with a hub $g$ which is fitted and secured to the end of a shaft $h$ mounted rotatably in a bearing $k$ of the casing, said shaft being positioned at right angles to the shaft $b$, to the end that the oscillation of the shaft $h$ will swing the lever $f$ lengthwise of the shaft $b$ and thus shift the gears $c$ and $d$ in the manner specified.

To secure the lever $f$ to the shaft $h$ the end of the latter is made triangular in cross section and a similarly shaped hole is made in the hub $g$ of the lever $f$, said hub preferably being split longitudinally, as at $m$; and after being fitted to the end of the shaft is secured thereon by means of a bolt $o$ passed through the split hub portion. Any other means of securing the hub to the shaft may be adopted if desired.

The ends of the forked lever $f$ are provided with rolls $p$, as usual in constructions of this character, which rolls fit the grooved collar $e$.

It will be observed that the forked part of the lever $f$, as viewed in Fig. 2, is of circular form, and of greater diameter than that of the gear $c$, and it will be observed also that over the end of the shaft $h$ to which the shifting lever is secured is an opening $r$ in the casing, closed by a cap $s$. On that end of the shaft $h$ extending through the casing, an arm $t$ is secured which, by suitable connections not shown, is actuated to swing the shifting lever in the manner described.

To remove the gear-shifting lever $f$ without dismounting any other parts of the mechanism, the cap $s$ is first unscrewed and through the opening $r$ in the casing thus provided a wrench may be introduced to unscrew the nut on the bolt $o$, or similar fastening, and the shaft $h$ may then be driven out of its bearing $k$, thus releasing the lever $f$.

By introducing the hand in the hand-hole $r$ in the top of the casing, (a part thereof only being shown in the drawings) the lever $f$ may be grasped and drawn towards the hand-hole until the largest diameter of the forked end of the lever is in position to pass it over the gear $c$ whereupon it may be turned and swung up flat towards the top of the casing, the shaft $b$ passing between the ends of the fork, and it may then be slid towards the hand-hole $r$ and taken out. It may be replaced by following these movements in reverse order.

What we claim, is:—

1. In a sliding gear transmission mechanism, a casing, sliding gears mounted therein, a gear-sliding lever having forked arms, the spread of which is greater than the diameter of one of the sliding gears, there being an opening through the casing inclosing the gears through which said lever may be dismounted from its bearing, whereby it may
5 be passed over one of the gears with which it engages to remove it from the casing.

2. In a sliding gear transmission mechanism, a casing a gear-sliding lever having forked arms, a gear with which said forked
10 arms engage, the diameter of the gear being less than the greatest spread of said arms whereby the lever may be passed over said gear and removed from its operative position, there being an opening in the casing inclosing said mechanism, through which said 15 lever may be passed.

JAMES FRANK DURYEA.
WILLIAM M. REMINGTON.

Witnesses:
WM. H. CHAPIN,
H. W. BOWEN.